United States Patent
Sun et al.

(10) Patent No.: US 10,015,309 B2
(45) Date of Patent: Jul. 3, 2018

(54) CONDITIONAL TWO STAGE DISTRIBUTED CORRELATION OF CP-UP FOR IMS PROTOCOLS

(71) Applicant: Tektronix Texas, Inc., Westford, MA (US)

(72) Inventors: Quenie Q. Sun, Allen, TX (US); William W. Sleeper, III, Lucas, TX (US)

(73) Assignee: NetScout Systems Texas, LLC, Westford, MA (US)

( * ) Notice: Subject to any disclaimer, the term of this patent is extended or adjusted under 35 U.S.C. 154(b) by 148 days.

(21) Appl. No.: 15/005,684

(22) Filed: Jan. 25, 2016

(65) Prior Publication Data
US 2017/0214790 A1    Jul. 27, 2017

(51) Int. Cl.
*H04M 3/22* (2006.01)
*H04W 24/08* (2009.01)
*H04L 12/26* (2006.01)
*H04L 29/06* (2006.01)

(52) U.S. Cl.
CPC .......... *H04M 3/2218* (2013.01); *H04L 43/12* (2013.01); *H04L 65/1006* (2013.01); *H04L 65/608* (2013.01); *H04W 24/08* (2013.01)

(58) Field of Classification Search
CPC ..... H04M 3/2218; H04W 24/08; H04L 43/12; H04L 65/608; H04L 65/1006
See application file for complete search history.

(56) References Cited

U.S. PATENT DOCUMENTS

2015/0146540 A1*   5/2015  Maria ................ H04L 65/1076
                                                         370/241

* cited by examiner

*Primary Examiner* — Peter Chau
(74) *Attorney, Agent, or Firm* — Locke Lord LLP; Scott D. Wofsy; Christopher J. Capelli (57) ABSTRACT

A system for monitoring calls in a VoLTE network is provided. The monitored calls include SIP, RTP and H.248 portions. The system includes monitoring probes and first and second correlation engine components (CECs). The probe is configured to generate SIP, RTP and H.248 data records (DRs), send the SIP DRs to a second CEC based on a distribution key, generate and send a routing label to a first CEC and to send the H.248 and RTP DRs to the first CEC based on the first and second attributes, respectively. The first CEC is configured to correlate the received RTP and H.248 DRs and the routing label based on the second and first attributes, respectively, and send the correlated DRs to the second CEC based on a distribution key. The second CEC is configured to bind all of the generated DRs to a single call based on the distribution key.

15 Claims, 8 Drawing Sheets

CONDITIONAL TWO STAGE DISTRIBUTED CORRELATION OF CP-UP FOR IMS PROTOCOLS

FIELD OF THE INVENTION

The present invention relates to techniques for traffic monitoring in a telecommunications network and, more particularly, relates to conditional two stage distributed correlation of the various signaling call flows across different network interfaces.

BACKGROUND OF THE INVENTION

In telecommunications networks, e.g., in cellular networks as specified by 3GPP ($3^{rd}$ Generation Partnership Project), communication services may be provided on the basis of Internet Protocol (IP) transport channels to a user equipment (UE). One example of such communication services is a voice call established through infrastructure of the network referred to as IP Multimedia Subsystem (IMS). In this case, an IMS node referred to as Proxy Call Session Control Function (P-CSCF) may interact with IP based transport infrastructure of the network, e.g., referred to as Evolved Packet Core (EPC) so as to provide IP based bearers for carrying User Plane (UP) traffic of the voice call to or from the UE. Such bearers may be regarded as an information transmission path having defined characteristics, such as capacity, delay, bit error rate, or the like. Other IP based communication services which may be provided in telecommunications networks include data calls using Voice over Internet Protocol (VoIP), VoIP over LTE (VoLTE) or other packet-switched technology, video call services, chat services, mobile TV services, and/or the like. However, for such IP based communication services there exist only limited possibilities of monitoring Quality of Service (QoS). For example, it is important to have a complete view of a "call" through the different interfaces and protocols. Since there is no common identifier across all involved interfaces and protocols, correlation capabilities of the various signaling call flows across different network interfaces remains to be a significant challenge.

It is, therefore, desirable to provide efficient and scalable techniques to combine/correlate various signaling call flows across different network interfaces throughout mobile operator's entire geographical area.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for monitoring calls in a VoLTE network is provided. The monitored calls include a Session Initiation Protocol (SIP) portion, a Real Time Protocol (RTP) portion and a H.248 portion. The network monitoring system includes one or more passive monitoring probes coupled to network interfaces and placed at different monitoring points. The monitoring probes are configured to capture data packets from the network interfaces. The data packets are associated with messages exchanged between network nodes. The monitoring probes are configured to generate one or more SIP data records, RTP data records and H.248 data records by monitoring the SIP, RTP and H.248 portions of the VoLTE calls. For each generated SIP data record, the monitoring probe is configured to send the generated SIP data record to a second correlation engine component based on a distribution key, generate a routing label and send the generated routing label to a first correlation engine component. The routing label includes at least the distribution key and first and second attributes. For each generated H.248 data record and RTP data record, the monitoring probe is configured to send the generated H.248 data record and RTP data record to the first correlation engine component based on the first and second attributes, respectively. The network monitoring system also includes the first correlation engine component receiving the generated data records and routing labels from the probes. The first correlation engine component is configured to correlate the one or more received RTP data records and the generated routing label based on the second attribute, correlate the received H.248 data records and the generated routing label based on the first attribute, insert the distribution key into the correlated RTP data records and H.248 data records and send the correlated RTP data records and H.248 data records to the second correlation engine component based on a distribution key. The network monitoring system also includes the second correlation engine component receiving the generated data records from the probes and the correlated data records from the first correlation engine component. The second correlation engine component is configured to bind the one or more generated SIP data records with the one or more correlated RTP and H.248 data records to a single call based on the distribution key.

In another aspect, a passive monitoring probe coupled to network interfaces for performing distributed correlation of data records associated with calls in a VoLTE network. The monitored calls include a Session Initiation Protocol (SIP) portion, a Real Time Protocol (RTP) portion and a H.248 portion. The monitoring probes are configured to generate one or more SIP data records, RTP data records and H.248 data records by monitoring the SIP, RTP and H.248 portions of the VoLTE calls. For each generated SIP data record, the monitoring probe is configured to send the generated SIP data record to a second correlation engine component based on a distribution key, generate a routing label and send the generated routing label to a first correlation engine component. The routing label includes at least the distribution key and first and second attributes. For each generated H.248 data record and RTP data record, the monitoring probe is configured to send the generated H.248 data record and RTP data record to the first correlation engine component based on the first and second attributes, respectively.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Figure 1:
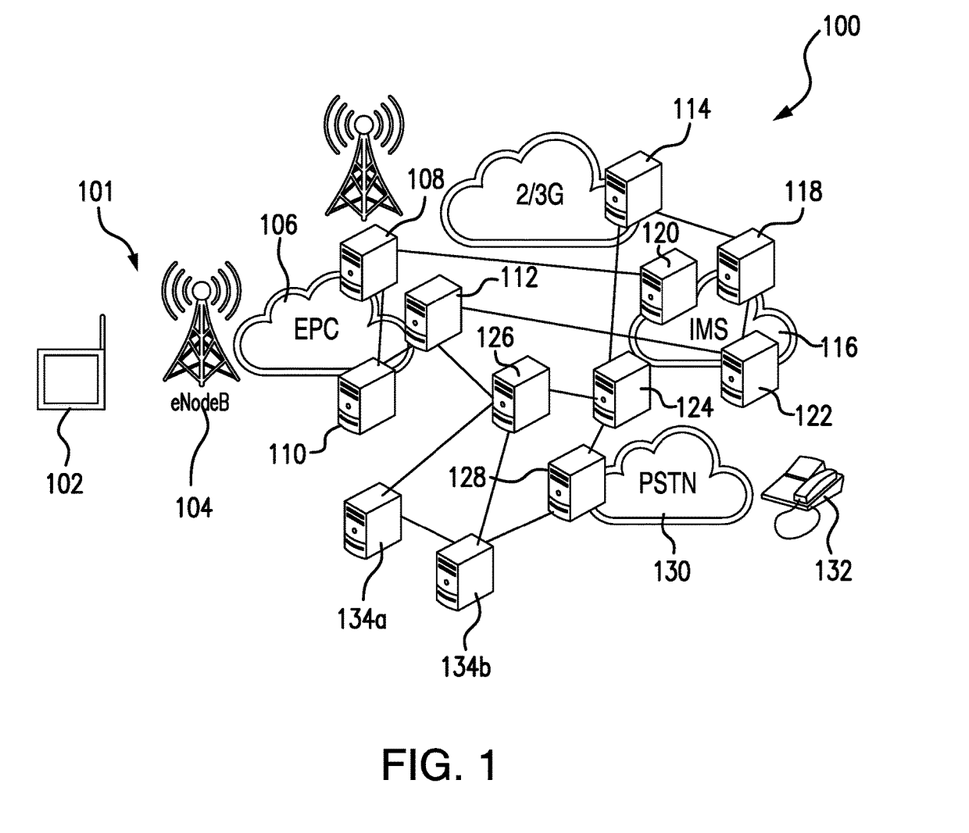
FIG. 1 illustrates a high level schematic diagram of a VoLTE network, according to one embodiment of the present invention.

Turning now descriptively to the drawings, in which similar reference characters denote similar elements throughout the several views, FIG. 1 depicts an exemplary high level schematic diagram of VoLTE network 100 depicting a network monitoring system in which below illustrated embodiments of the present invention for correlating various signaling call flows across different network interfaces may be implemented.

The high level architecture of the VoLTE network 100 comprises an Evolved Universal Terrestrial Radio Access Network (E-UTRAN) 101 and an EPC 106. The VoLTE scheme for providing voice over an LTE system utilizes an IMS 116. The IMS 116, in turn, interfaces multimedia information (e.g., voice and data) to the public network, PSTN 130. The PSTN 130 facilitates communication with any telephone 132 connected to a fixed telephone line (e.g., telephone line of PSTN 130).

The network elements making up the E-UTRAN 101 include UEs 102 and a plurality of radio base stations in the form of Evolved NodeBs (eNodeBs) 104. Each of the UEs 102 may be any type of device configured to operate and/or communicate in a wireless environment. By way of example, the UE 102 may be configured to transmit and/or receive wireless signals and may include a mobile station, a fixed or mobile subscriber unit, a pager, a cellular telephone, a personal digital assistant (PDA), a smartphone, a laptop, a netbook, a personal computer, a wireless sensor, consumer electronics, and the like.

The eNodeBs 104 provide communication between the UEs 102 and the EPC 106. Each eNodeB 12 communicates with UEs 102 in one or more cells. The particular eNodeB 104 that communicates with a given UE 102 at a given time is known as its serving eNodeB 104. As will be appreciated by those skilled in the art, a UE 102 is not necessarily bound to a single serving eNodeB 104. If, for example, the UE 102 is transported to a different geographical location, the UE 102 may move into the control of a different eNodeB 104. The components making up an eNodeB 104 will be familiar to those skilled in the art.

The network elements making up the EPC 106 include a Mobility Management Entity (MME) 108, one or more Serving Gateways (SGW) 110 and Packet data network Gateways (PGW) 112. The embodiment illustrated in FIG. 1 comprises one SGW 110 and one PGW 112 but it will be appreciated that the network 100 could comprise any number of SGWs 110 or PGWs 112 providing there is at least one of each of these network elements.

Each SGW 110 is configured to serve one or more eNodeBs 104. Similarly, each PGW 112 is configured to serve one or more SGWs 110. A UE 102 may have simultaneous connectivity with multiple PGWs 112 in order to access multiple packet data networks.

FIG. 1 illustrates exemplary environment in which a UE 102 can initiate a voice call using a LTE radio access network and is subsequently handed over to a PSTN 130. The call is established using the IMS network 116 described below and which provides a common service control network for the Packet Switched (PS) and Circuit Switched (CS) domains provided through the LTE 100. In order to implement the access handover, media control must be transferred from the EPC network 106 of the 4G domain to an allocated Mobile Switching Centre (MSC) 114 within the 2G/3G domain. The MSC 114 performs switching functions including call set-up, release, and routing.

The IMS 116 is an architectural framework for delivering Internet Protocol multimedia services and enables a variety of services to be run seamlessly rather than having several disparate applications operating concurrently. The IMS 116 includes a P-CSCF or Session Border Controller (SBC) 124 that interfaces with the EPC 106. The P-CSCF is the first IMS node encountered when a UE 102 is trying to establish a VoLTE call. The P-CSCF locates an Interrogating-CSCF (I-CSCF) for the user and the I-CSCF in turn locates a Serving-CSCF (S-CSCF) for the user.

To set up a VoLTE call, the UE 102 first has to have a default bearer in place. At power on, the UE 102 sends an ATTACH REQUEST to the MME 108. The MME 108 queries the Home Subscriber Server (HSS) 120 to retrieve the subscriber's profile. The profile contains the user's default Access Point Name (APN), which for VoLTE calls is the IMS 116. The MME 108 determines the appropriate SGW 110 and PGW 112 for the call. The eNodeB 104, the SGW 110 and the PGW 112 establish a default bearer and the PGW 112 supplies the UE 102 with an IP address. In addition to the UE's 102 IP address, the PGW 112 may also provide the P-CSCF IP address. When the attach procedure is complete, the default bearer is established, and the UE 102 has an IP address for itself and the IP address of the P-CSCF. The X-CSCF node 122 represents any of the I-CSCF, P-CSCF and S-CSCF.

An Application Server (AS) 118 is additionally shown in FIG. 1. AS 118 may provide services to UEs 102, such as services relating to the addition of supplementary functionality to UEs 102. In some implementations, AS 118 may provide updates to UEs 102, which may include providing software that allows UEs 102 to provide VoLTE services. For example, a VoLTE client application may be pushed to UEs 102 through an over the top (OTT) transmission, or the VoLTE client application to be downloaded to UEs 102 using other technologies. In some implementations, a user of UE 102 may be notified, such as via a text message, to the downloading and installation of the VoLTE client application before the VoLTE client application is installed.

The VoLTE communications network 100 further comprises a Media Resource Function Processor (MRFP) 126. The MRFP 126 is a media plane node used to mix, source or process media streams. It can also manage access right to shared resources. The VoLTE communications network 100 may further comprise a Media Resource Function Controller 302 (shown in FIGS. 3A and 3B). The MRFC 302 is a signaling plane node that interprets information coming from the S-CSCF to control the MRFP 126.

Also, a Breakout Gateway Control Function (BGCF) may coexist with the CSCF or as a standalone module. The BGCF selectively passes calls to the PSTN 130 through a Media Gateway (MGW) 128 under control of Media Gateway Control Function (MGCF) (not shown in FIG. 1). So, the IMS network 116 interfaces to the PSTN 130 with a signaling gateway in the MGCF interfacing the signaling plane, and the MGW 128 interfacing the media plane. The MRFP 126 can implement both call treatment and media-related functions. The MRFP 126 interfaces with the AS 118 and the X-CSCF 122 through a Multi-Point SIP (MP SIP) interface.

According to an embodiment of the present invention, a plurality of monitoring probes 202 (shown in FIG. 2) may be implemented in the LTE network 100. For example, while in IMS environment 116, the monitoring probes 202 may be coupled to SIP-based IMS interface. The monitoring probes 202 non-intrusively coupled to one of the VoLTE interfaces preferably capture substantially all of the protocol messages traveling across these interfaces. In addition, monitoring equipment may identify the messages belonging to each voice or data call and send the generated call or data records to a distributed correlation engine 134a, 134b. According to an embodiment of the present invention, the distributed correlation engine 134a, 134b is configured to correlate those data records and messages across different network interfaces into one call record per call, one SMS record per SMS message, and so on. In one embodiment, a distributed correlation engine is provided comprising two or more distinct components, such as first 134a and second 134b components. As discussed below, in one exemplary embodiment, the first component 134a may be configured to correlate RTP data records and H.248 data records with the routing label generated by the monitoring probes 202, while the second component 134b of the distributed correlation engine may be configured to bind the generated SIP records with the correlated RTP and H.248 data records to a single call, SMS message, etc. to achieve end-to-end correlation.

Figure 2:
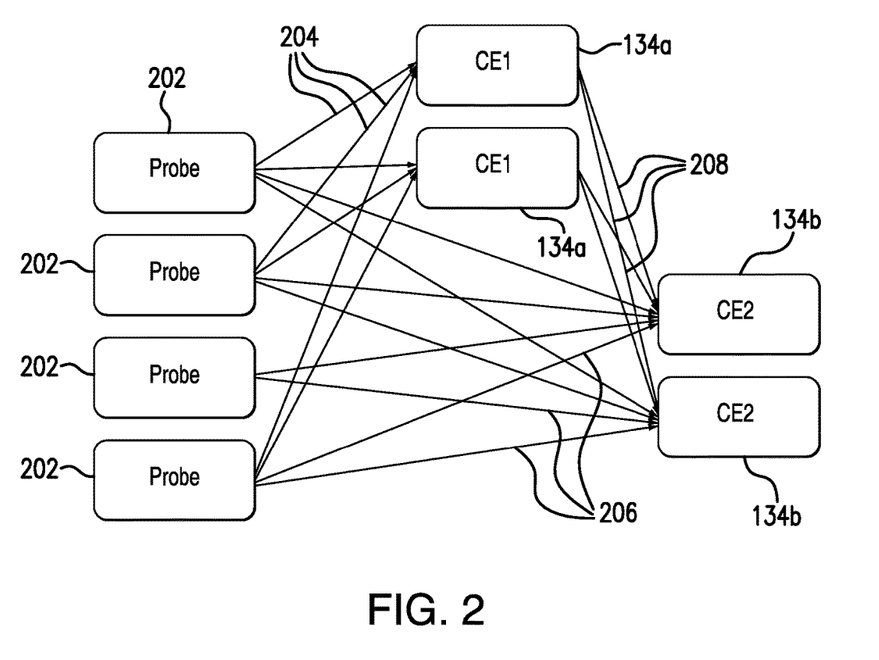
FIG. 2 is a simplified block diagram of a distributed VoLTE network monitoring and signaling correlation system, according to one embodiment of the present invention.

FIG. 2 is a simplified block diagram of a distributed LTE network monitoring and signaling correlation system, according to one embodiment of the present invention. As noted above, a plurality of network probes 202, implemented as a software component, may be placed at different locations in the VoLTE network 100 being monitored. A network probe 202 monitors data packets traversing through the network 100. More specifically, the deployed network probe 202 monitors low level activity of the network interfaces of the network 100 they are deployed to, to gain information about sent, received and passing network packets and to generate corresponding data records discussed in greater detail below. Such a pure software based version of a network probe allows tighter interaction with the correlation engine components 134a and 134b deployed in the monitored network 100. This could reduce the efforts required to monitor the VoLTE network 100 activity by removing the need to install a separate network appliance, and could additionally reduce the load of the various signaling call flows correlations.

According to an embodiment of the present invention, each correlation engine component may comprise two or more processors. While only two first correlation engine components 134a, two second correlation engine components 134b and four monitoring probes 202 are depicted in FIG. 2, it should be obvious that additional correlation engine components 134a, 134b and additional monitoring probes 202 can be implemented in the shown arrangement.

FIG. 2 illustrates an exemplary mesh topology arrangement, such that every monitoring probe 202 is communicatively coupled, directly and/or indirectly, via a set of links 204, 206 to every component 134a, 134b included in the distributed correlation engine. Furthermore, all correlation engine components 134a, 134b are also communicatively coupled to each other via a plurality of links 208.

Figure 3A:
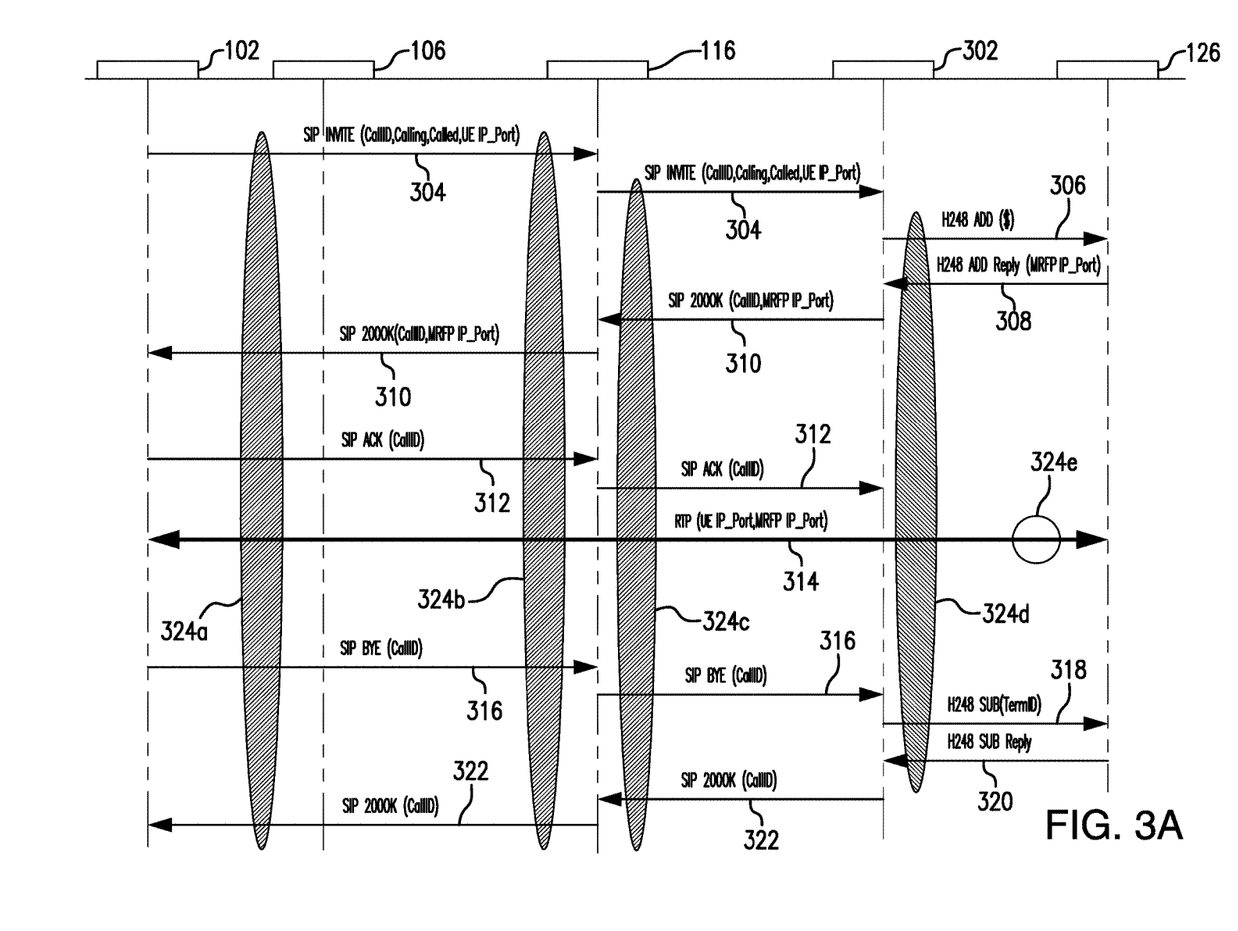
FIG. 3A is a diagram illustrating signaling in an environment in a VoLTE to PSTN call scenario, in accordance with an embodiment of the present invention.

FIG. 3A is a sequence diagram illustrating signaling in an environment in a VoLTE to PSTN call scenario such that calls originating or terminating at UEs 102 or phones 132 outside of the LTE network 100 are partially carried over Circuit Switched (CS) bearers, in accordance with an embodiment of the present invention.

Once attached to the VoLTE network 100, the UE 102 initiates SIP registration. The UE 102 sends a request to access the network 100 that may take the form of a SIP Registration message (SIP Invite 304). The SIP registration message 304 may include a Call-ID field, calling ID for the caller, some information identifying the called party and the port number where the UE 102 expects to receive a response to its message, for example. The Call-ID field, such as, "123456789" uniquely identifies the SIP registration message 304. The calling ID may be any information for the caller such as MSISDN (Mobile Station International Subscriber Directory Number) and/or IMSI (International Mobile Subscriber Identity), for example. Other information may also be sent with the calling ID, such as a caller's name. The SIP Invite message 304 also contains some information identifying the called party, i.e., telephone 132 depicted in FIG. 1. The port number field specifies a port on which the UE 102 is prepared to receive the RTP data it requested. The registration message 304 also contains an identification of the subscriber's home domain of the UE 102 and using this information, the P-CSCF consults a DNS server and identifies an I-CSCF in the UE's 102 home network. The P-CSCF forwards the Registration request to the I-CSCF, and ultimately it reaches the S-CSCF.

The S-CSCF 116 forwards the SIP Invite message 304 to the MRFC server 302. The MRFC 302 is a signaling plane node that interprets information coming from the S-CSCF to control the MRFP 126. The MRFC server 302 acknowledges the SIP Invite message 304 with an SIP Trying message and allocates a uniform resource identifier (URI), in one embodiment.

According to 3GPP protocol architecture 23.002, the interface between the MRFC 302 and the MRFP 126 is defined as an Mp interface, which is based on the ITU-T H.248 protocol. Terminations and contexts are two basic components of H.248. A termination represents a stream entering or leaving the MGW 128 (for example, analogue telephone lines or RTP streams). A termination can represent a physical connection in the form of, for example, time slots or a logical connection, and can be persistent (circuit based) or ephemeral (streams set up and torn down within the course of a call).

Terminations may be placed into contexts, which are defined as when two or more termination streams are mixed and connected together. A context associates collections of terminations and describes the media switching and mixing parameters as well as topology of the associations when more than two terminations exist. A connection is made when two or more terminations are placed in the same context. A context can have many terminations, but a termination can only exist in one context at a time. Contexts are created and released by the MGW 128 under the command of the MRFC 302. A context is created by adding the first termination, and it is released by removing (subtracting) the last termination.

As shown in FIG. 3A, the SIP Invite message 304 originating from the UE 102 is translated by the MRFC 302 to an H.248 Add command 306, which is sent to the MRFP 126 by the MRFC 302. The MRFP 126 requests the MGW 128 for a new context. A call session (e.g., RTP connection) is represented by an H.248 context in the MRFC 302 and the MRFP 126. The UE 102 is represented as an H.248 termination in the context. The termination has a stream representing the RTP media to/from the UE 102. The MRFP 126 allocates resources to send and receive RTP packets when a RTP stream is added. The Add command 306 carries the call setup parameters for the termination. In one embodiment, the MRFP 126 requests the MGW 128 for a circuit switched ports towards the PSTN network 130. Note that this termination is being requested for the context that was setup for the RTP connection.

Using the H.248 Add-Reply command 308, the MGW 128 returns the resources that are allocated to the added termination for this call to the MRFP 126. In one embodiment, the MGW 128 responds with the allocated context, the local IP address and the RTP port number. In addition, the MGW 128 responds with the circuit switched termination. In step 308, in the reply from the MRFP 126 to the MRFC 302, the MRFP 126 returns the media parameters to receive media on the RTP streams in an SDP (Session Description Protocol) present in the local descriptors. A SDP is a key element of SIP-based multimedia sessions. The SDP comprises a plurality of fields which define session's parameters. Each line corresponds to a field. Terminations representing gates for RTP traffic typically require two streams per media (one for RTP packets, one for RTCP packets). It is noted that the Add Reply 308 from the MRFP 126 carries information relating to address port for the RTP connection of the MRFP 126.

As shown in FIG. 3A, a 200 OK message 310 can be used by the MRFC 302 to pass information and setup the voice call. S-CSCF passes a 200 OK message 310 to the P-CSCF 116, which passes a 200 OK message 310 to the UE 102. Acknowledgement messaging can be passed back before beginning the call. For example, the calling UE 102 sends an SIP Ack message 312 to the MRFC 302 to confirm receipt of the "200 OK" message 310 and to confirm the codec selection. The call is then set up. The UE 102 establishes a RTP connection 314 for delivering the media stream (call) to the MRFP 126 based on the received information relating to the address ports for RTP connection. The RTP connection 314 is generally established through UDP. In other words the call initiator (UE 102) starts the media flow for this session. The RTP data stream is started towards the MRFP 126. Bidirectional voice path is now through. In one embodiment, the MGW 128 converts RTP data stream to voice and vice versa. The UE 102 also maps audio to RTP and back.

When the calling party hangs up, the UE 102 sends SIP Bye message 316 towards S-CSCF 116. The transmitted Bye message 316 includes the Call-ID field. Upon receiving a SIP Bye message 316 from the UE 102, the S-CSCF may release the established session by forwarding the SIP Bye message 316 to the MRFC server 302. In step 318, the MRFC 302 initiates call teardown procedures by sending a H.248 Subtract message 318 to the MRFP 126. It is noted, the MRFC 302 sends a resource release (Subtract) request message 318 to the MRFP 126, indicating MRFP release terminations and other related resources. The MRFP 126 will in accordance with the general rules of H.248 delete the context when the corresponding termination has been subtracted from the context. In step 320, the MRFP 126 returns a response 320 to the MRFC 302. The response 320 indicates that the PSTN network 130 acknowledged the call release. As shown in FIG. 3A, a 200 OK message 322 can be used by the MRFC 302 to acknowledge the SIP Bye message 316. S-CSCF passes a 200 OK message 322 to P-CSCF 116, which relays 200 (OK) response 322 to the UE 102.

According to at least one aspect of the present invention, a plurality of monitoring probes 202 placed at different monitoring points within the VoLTE network 100 are configured to capture information from each signaling message shown in FIG. 3A and to generate detail records, such as Call Detail Records (CDRs) or Transaction Detail Records (TDRs), based on the captured information. Detail records, such as, CDRs of a specific call or Transaction Detail Records (TDRs) of a specific data session can be constructed from signaling information transmitted between signaling links within the VoLTE network 100. The terms "CDR" and "TDR" may be used interchangeably in the context of a VoLTE network 100 disclosed herein, and can be broadly described simply as a "data record". The probes 202 are "programmed" with patterns to recognize, the patterns being present in packets that are the subject of a monitoring task. For example, three different monitoring probes 202 placed at different monitoring points may be configured to monitor a SIP call establishment/termination dialogues. When a first probe recognizes a pre-programmed pattern (e.g., SIP Invite message 304) traversing the link at the point where the probe 202 is located (e.g., between the UE 102 and the EPC 106), the probe 202 generates a first data record 324a. Similarly, second and third data records 324b and 324c are generated by other monitoring probes 202 also configured to monitor the SIP call establishment/termination dialogues but attached to interfaces between the EMC 106 and the IMS 116 and between the IMS 116 and the MRFP 126, respectively. Furthermore, the fourth and fifth data records 324d and 324e are generated by the monitoring probes 202 configured to monitor H.248 and RTP signaling exchanges, respectively. According to an embodiment of the present invention, the generated data records 324 may be sent to one of the components of the distributed correlation engine 134. According to at least one aspect, the received information is analyzed by the correlation engine 134 in a real time fashion for enhanced correlation capabilities, as described below.

Figure 3B:
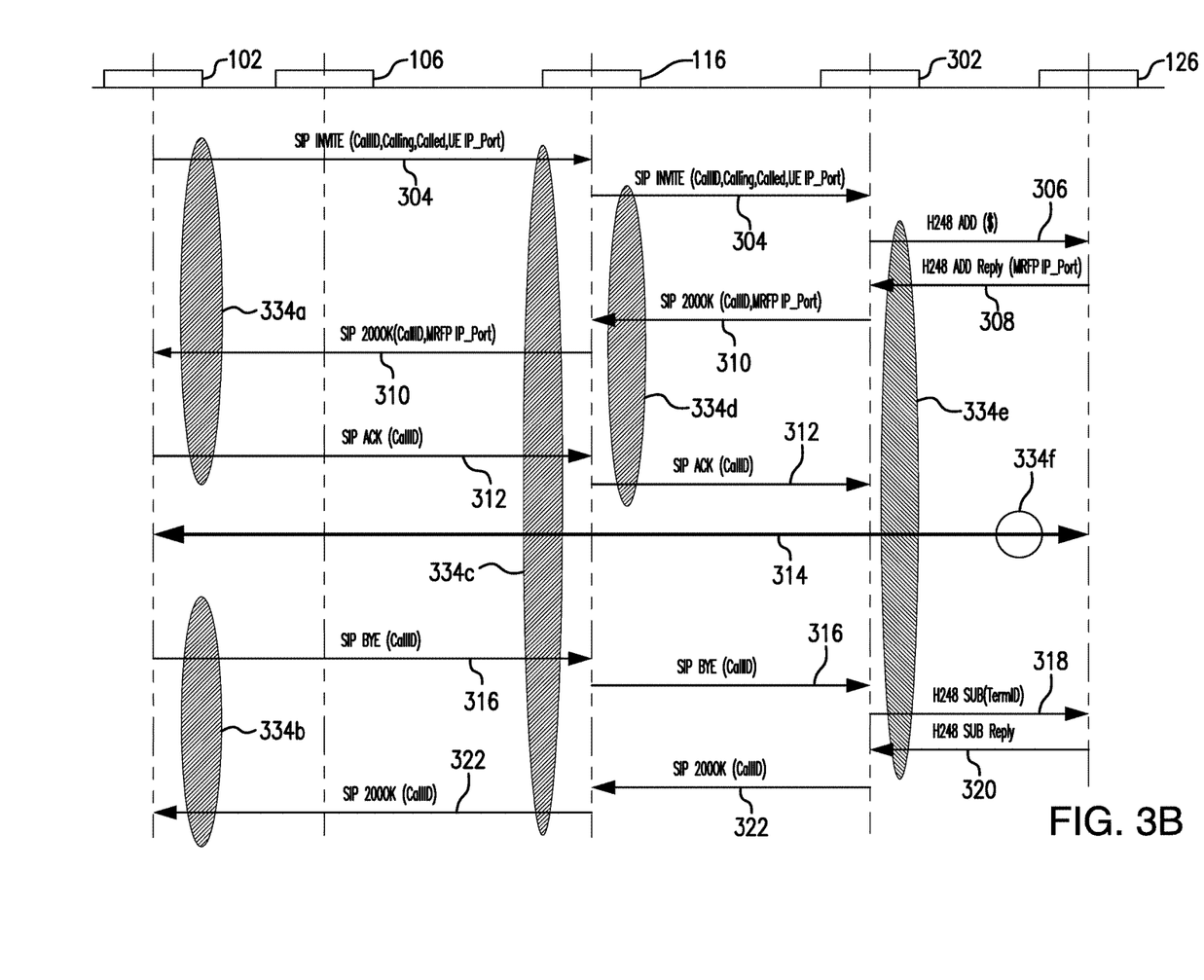
FIG. 3B is a diagram illustrating signaling in an environment in a VoLTE to PSTN call, with handover scenario, in accordance with an alternative embodiment of the present invention.

FIG. 3B is a diagram illustrating signaling in an environment in a VoLTE to PSTN call, with handover scenario, in accordance with an alternative embodiment of the present invention. The majority of messages illustrated in FIG. 3B are similar to the messages illustrated in FIG. 3A and will not be repetitively described herein for purposes of brevity and clarity. In cellular telecommunications, the term "handover" refers to the process of transferring an ongoing call or data session involving a wireless terminal from one node, channel, or radio access technology to another node, channel, or radio access technology. For example, UE 102 participating in an ongoing call handled by a first eNodeB 104 may have the call or session handed over to a second or target eNodeB 104 when measurements from the UE 102 indicate that it would be appropriate or beneficial for such handover to occur.

As described above with reference to FIG. 1, the EPC 106 includes the SGW 110 and the PGW 112. The gateway nodes 110 and 112 are in the user plane, and transport IP data traffic between the UE 102 and other networks such as the IMS 116. All user plane IP packets are transferred through the SGW 110 and the PGW 112. The SGW 110 routes and forwards user IP data packets while also acting as the mobility anchor for the user plane during inter-eNodeB 104 handovers.

Referring back to FIG. 3B, there is shown a plurality of data records 334a-334f generated by a plurality of monitoring probes 202 placed at different monitoring points within the VoLTE network 100. However, in this case, due to the occurrence of the abovementioned inter-eNodeB handover, the second half of the call (after the handover), at least with respect to SIP communication, is monitored by a different probe 202, which is configured to monitor the handover target SGW 110. As a result, the first SIP data record 334a corresponding to SIP Invite message 334a signaling exchange is generated by one probe 202, while the second SIP data record 334b corresponding to call session termination SIP signaling 322 is generated by another probe 202 placed at a different monitoring point. It is noted that the first data record 334a includes a Call-ID field, calling ID for the caller, some information identifying the called party and the RTP port number, while the second SIP data record 334b may be correlated to the first SIP data record 334a only by the Call-ID field, thus making correlation of end-to-end data records even more challenging in this scenario. It is further noted that data records 334c-334f depicted in FIG. 3B are similar to the data records 324b-324e illustrated in FIG. 3A and will not be repetitively described herein for purposes of brevity.

Figure 4:
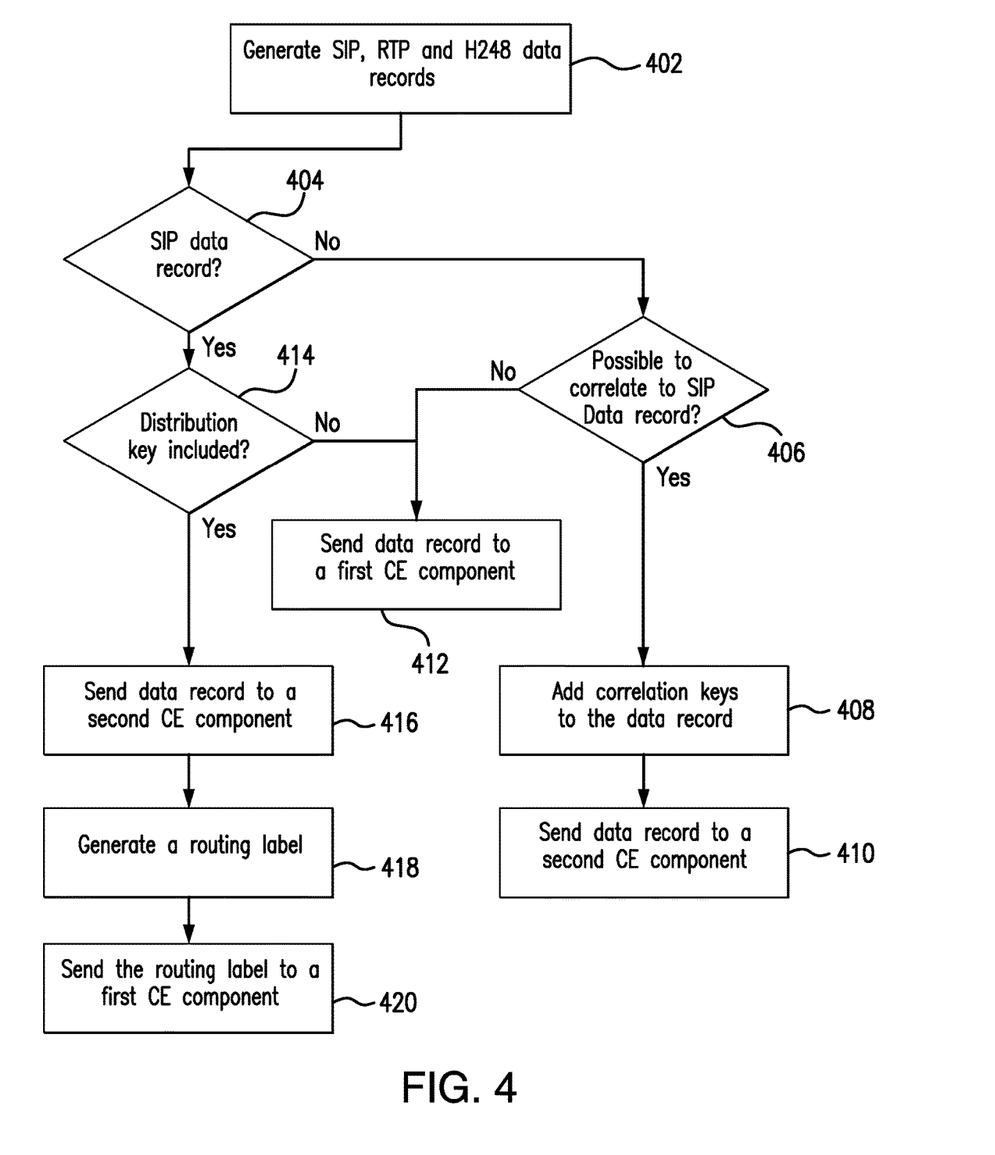
FIG. 4 is a flowchart illustrating exemplary steps performed by a plurality of monitoring probes placed at different monitoring points within a VoLTE network for monitoring and generating call related data records, in accordance with an embodiment of the present invention.
Figure 5:
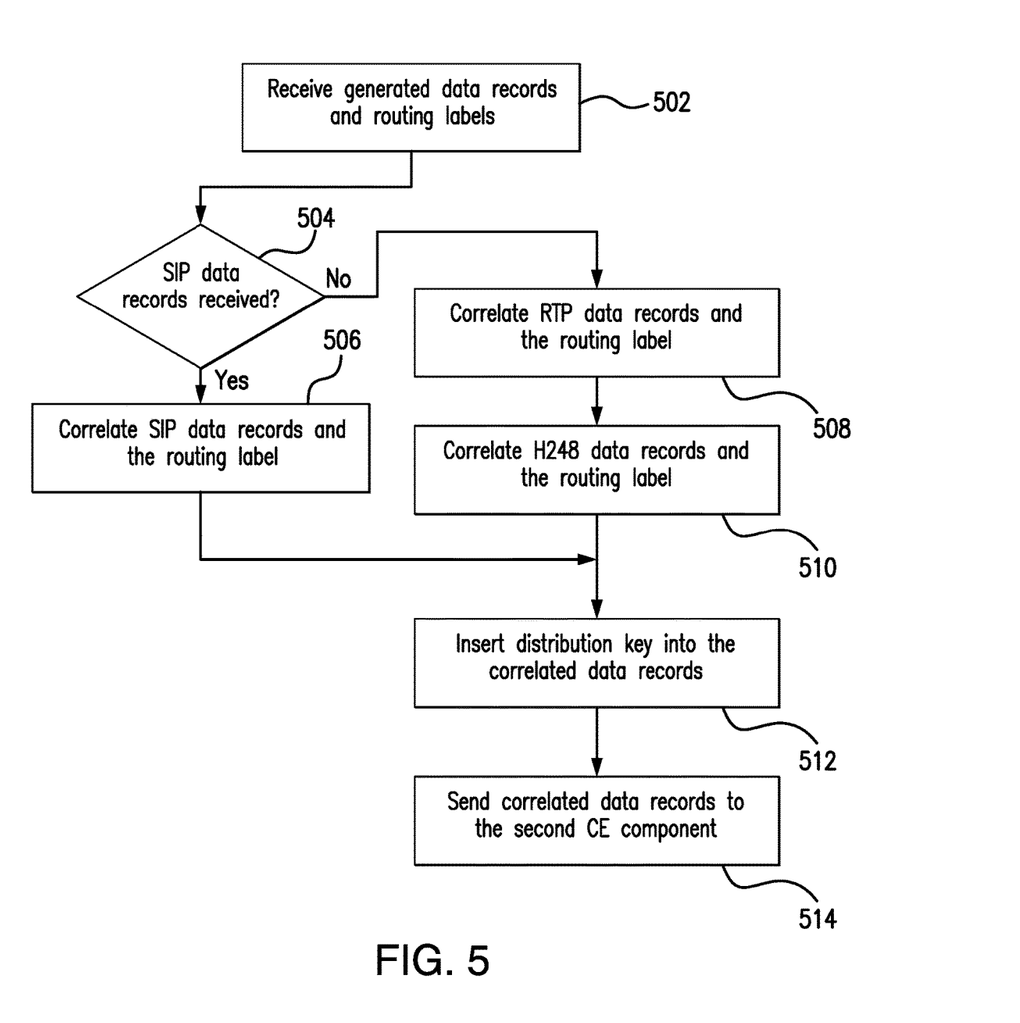
FIG. 5 is a flowchart illustrating exemplary steps performed by a first component of a distributed correlation engine, in accordance with an embodiment of the present invention.
Figure 6:
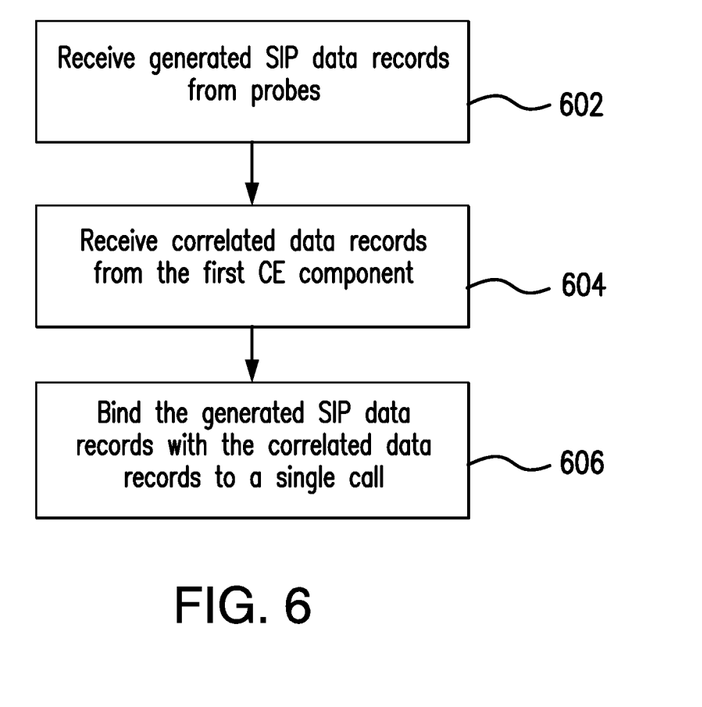
FIG. 6 is a flowchart illustrating exemplary steps performed by a second component of a distributed correlation engine, in accordance with an embodiment of the present invention.

FIGS. 4-6 are flowcharts illustrating exemplary process for performing end-to end correlation of data records corresponding to the same call, in accordance with embodiments of the present invention. Before turning to description of FIGS. 4-6, it is noted that the flow diagrams in FIGS. 4-6 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included. The method for performing distributive end-to-end correlation of data records may be executed on monitoring probes 202 and two or more components of the correlation engine 134 shown in FIG. 2.

Referring now to FIG. 4, there are shown exemplary steps performed by a plurality of monitoring probes 202 coupled to various VoLTE network interfaces and placed at different monitoring points. According to an embodiment of the present invention, at step 402, the plurality of monitoring probes 202 generate a plurality of data records 324, 334 for captured signaling data related to SIP, RTP and H.248 signaling protocols, as described above in conjunction with FIGS. 3A and 3B. The wide variety of different messages and associated parameters involved in the procedure outlined in FIGS. 4-6 preclude simple correlation of the messages to assemble a comprehensive data record for a call which is set up using media gateways in the manner described above. For example, there is no counterpart to the combination of information identifying calling/called party and the Call_ID information which can be used to associate SIP signaling messages all relating to the same call uniquely with one another—the unique Call-ID field in the SIP Invite message 304 is not necessarily present in every RTP and/or H.248 message. Nonetheless, call monitoring, fraud detection, billing verification and other network management functions require the availability of data records having a complete view of a call for calls set up via different interfaces and protocols. Embodiments of the present invention enable such data records to be assembled from various messages generated in accordance with various protocols (such as SIP, RTP and H.248). The examples described herein are discussed for convenience in the context of SIP, RTP and H.248 messages. However, references to particular protocol terminology and concepts, such as Call-ID, are to be taken as embracing references to equivalent terminology and concepts for implementation in the context of other protocols.

According to an embodiment of the present invention, all the correlations performed collectively by the plurality of monitoring probes 202 and by various components of the correlation engine 134 can be seen as a sequence of control plane/user plane and control plane/control plane correlations where the control plane/user plane correlation can use the "Media IP Pair" attributes for correlation purposes and the control plane/control plane correlation can use the calling number information as a distribution key. A "Media IP pair" consists of an IP address and a pair of ports. According to an embodiment of the present invention, whenever possible, the monitoring probes 202 attempt to correlate the data records based on a distribution key. This correlation is possible only if the distribution key is present in all data records being correlated.

As shown in FIG. 4, at step 404, the newly generated data records 324, 334 are examined to identify SIP data records 324a-c, 334a-d. In one embodiment, data records corresponding to SIP sessions 324a-c, 334a-d are identified by filtering the data record 324, 334 by SIP IP signalization. If the monitoring probe 202 determines that the examined data record 324, 334 corresponds to either RTP session or H.248 session (decision block 404, "no" branch), the monitoring probe 202 determines whether it is possible to correlate the examined data record 324, 334 with an SIP session. In some embodiments, the same probe 202 may monitor both the RTP and SIP portions of a call in which case the correlations of those portions would be possible. Thus, in one embodiment, at step 406, the monitoring probe 202 determines whether it monitors both the RTP and SIP sessions of a call. If so (decision block 406, "yes" branch), at step 408, the monitoring probe 202 adds correlation keys normally associated with a SIP session (e.g., calling/called party ID, Call-ID, etc.) to the RTP data record 324e, 334f by using IP address pair attribute to correlate the corresponding data records. At step 410, the monitoring probe 202 sends the amended RTP data record 324e, 334f to the second correlation engine component 134b via a second plurality of links 206 (shown in FIG. 2). Advantageously, this correlation step performed by the monitoring probe at step 408 reduces the processing load on the second component 134b and effectively makes the correlation performed by the second component 134b optional.

In cases where two different monitoring probe entities 202 monitor the SIP and RTP portions of a call independently or if the examined data record 324, 334 corresponds to a H.248 portion of the monitored call (decision block 406, "no" branch) this correlation will not be possible because those records do not contain the distribution key and thus, at step 412, the monitoring probe 202 sends the examined data record 324, 334 to the first correlation engine component 134a for centralized correlation via a first plurality of links 204. It is noted that undecorated H.248 data records 324d, 334e are sent to the first correlation engine component 134a based on the IP_Port attribute contained in the H.248 Add Reply message 308, for example. On the other hand, the RTP data records 324e, 334f are sent to the first component 134a based on the IP_Port_Pair attribute (e.g., UE IP_Port and MRFP IP_Port) contained in messages exchanged via the RTP connection 314, for example.

If the monitoring probe 202 determines that the examined data record 324, 334 corresponds to a SIP session (decision block 404, "yes" branch), the monitoring probe 202 determines whether the distribution key is present in the examined SIP data record 324a-c, 334a-d. Referring back to the scenario illustrated in FIG. 3B, due to the occurrence of the inter-eNodeB handover, pre- and post-handover portions of a call, with respect to SIP communication, are monitored by different probes 202 and these probes 202 generate two different SIP data records 334a and 334b, respectively. It is noted the latter SIP data record 334b does not include the distribution key. According to an embodiment of the present invention, to distinguish between the two different types of SIP data records 334a and 334b, at step 414, the monitoring probe 202 further analyzes SIP signaling data to determine whether the examined SIP data record 324a-c, 334a-d contains a distribution key. In response to determining that the examined SIP data record 334b does not include the distribution key (decision block 414, "no" branch), the monitoring probe 202 returns to the step 412 in order to send the examined SIP data record 334b to the first component 134a of the distributed correlation engine for centralized correlation via the first plurality of links 204. Since the distribution key does not exist in the SIP data record 334b, the monitoring probe 202 sends the SIP data record 334b to the first correlation engine component 134a based on the Call-ID attribute.

Responsive to a determination that the examined SIP data record 324 a-c, 334 a,c,d includes the distribution key (decision block 414, "yes" branch), the monitoring probe 202 sends the examined SIP data record 324 a-c, 334 a,c,d directly to the second correlation engine component 134b via the second plurality of links 206 based on the calling party identifier attribute (step 416). Next, since routing label generation is enabled for the SIP message domain, at step 418, the monitoring probe 202 generates a routing label. In one embodiment, the routing label comprises an abbreviated data record and contains the distributing key and all provisioned attributes, namely, the calling party number, IP_Port_Pair and Call-ID attributes. Furthermore, according to an embodiment of the present invention, the monitoring probe 202 sends the generated routing label to the to the first correlation engine component 134a based on the IP_Port_Pair attribute. Note the first correlation engine component 134a and second correlation engine components 134b utilize the generated routing label to perform the distributed correlation as described below.

FIG. 5 is a flowchart illustrating exemplary steps performed by the first correlation engine component 134a, in accordance with an embodiment of the present invention. At step 502, the first correlation engine component 134a receives generated data records and routing labels. Next, at step 504, the first correlation engine 134a determines whether the received data records include SIP data records 334b. If it is determined that the received data record comprises SIP data record 334b (decision block 504, "yes" branch), at step 506, the first correlation engine component 134a correlates the SIP data record 334b with the received routing label based on the Call-ID attribute. As a result of such correlation, the first correlation engine component 134a acquires a distribution key (i.e., the calling party number). Subsequently, at step 512, the first correlation engine component 134a inserts the distribution key into the SIP data record 334b. At step 514, the first correlation engine component 134a transmits the amended SIP data record 334b to the second correlation engine component 134b based on the distribution key via third plurality of links 208.

In response to determining that the examined received data records are not SIP data records (decision block 504, "no" branch), the first correlation engine 134a first correlates RTP data records 324e, 334f with the received routing label based on common attribute IP_Port_Pair (step 508). In addition, at step 510, the first correlation engine 134a correlates H.248 data records 324d, 334e with the routing label based on common IP_Port attribute. Once the first correlation engine component 134a acquires the distribution key, it inserts the distribution key into the correlated data records 324e, 334f and 324d, 334e and transmits the amended data record 324e, 334f and 324d, 334e to the second correlation engine component 134b based on the distribution key via third plurality of links 208 (steps 512 and 514, respectively).

FIG. 6 is a flowchart illustrating exemplary steps performed by the second correlation engine component 134b, in accordance with an embodiment of the present invention. At step 602, the second correlation engine component 134b receives the generated SIP data records 324 a-c, 334 a,c,d having the distribution key from a plurality of monitoring probes 202 via the second plurality of links 206. In addition, at step 604, the second correlation engine component 134b receives the correlated data records 324d-e, 334 b,e,f from the first correlation engine 134a via the third plurality of links 208. Since all data records received in steps 602 and 604 include the distribution key, at step 606, the second correlation engine component 134b binds all of them to a single call based on the distribution key.

In summary, various embodiments of the present invention disclose a novel and seamless approach to combine/correlate the various signaling call flows across different network interfaces throughout entire VoLTE network 100, even though there is no common identifier across all interfaces and protocols. In one aspect, software programming code embodying the present invention provides capability to perform the correlation in a distributed and scalable manner. Additionally, as yet another benefit of the disclosed embodiments, such distributed correlation can be performed with a minimum amount of resources and provisioning.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
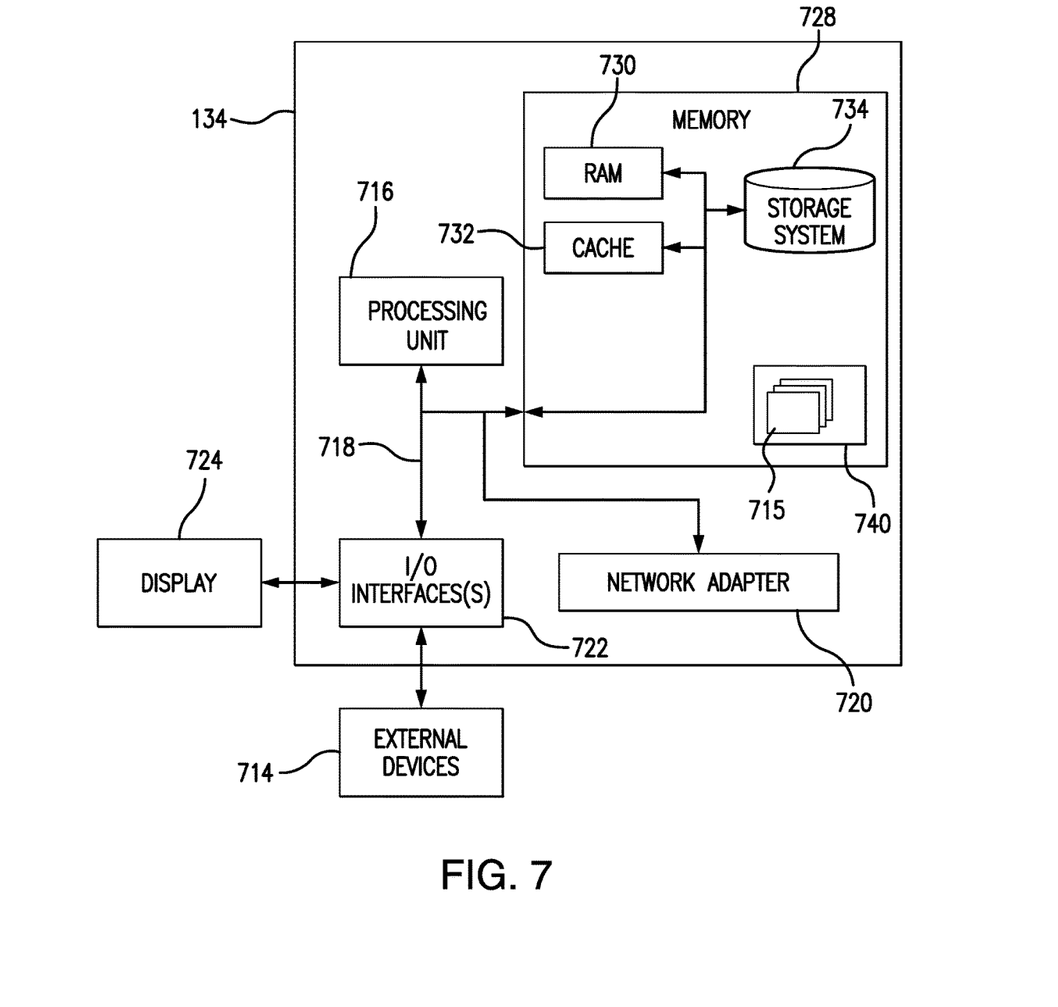
FIG. 7 illustrates internal and external components of the distributed correlation engine of FIG. 1 in accordance with an illustrative embodiment of the present invention.

Embodiments of the distributed correlation engine 134 may be implemented or executed by one or more computer systems. One such computer system, the correlation engine 134 is illustrated in FIG. 7. In various embodiments, the correlation engine 134 may be a server, a distributed computer system, a workstation, a network computer, a desktop computer, a laptop, or the like.

The distributed correlation engine 134 is only one example of a suitable system and is not intended to suggest any limitation as to the scope of use or functionality of embodiments of the invention described herein. Regardless, the correlation engine 134 is capable of being implemented and/or performing any of the functionality set forth hereinabove.

The correlation engine 134 is operational with numerous other general purpose or special purpose computing system environments or configurations. Examples of well-known computing systems, environments, and/or configurations that may be suitable for use with the correlation engine 134 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of correlation engine 134 may be described in the general context of computer system-executable instructions, such as program modules, being executed by a computer system. Generally, program modules may include routines, programs, objects, components, logic, data structures, and so on that perform particular tasks or implement particular abstract data types. The correlation engine 134 may be practiced in distributed data processing environments where tasks are performed by processing devices that are linked through a communications network. In a distributed data processing environment, program modules may be located in both local and remote computer system storage media including memory storage devices.

The correlation engine 134 is shown in FIG. 7 in the form of a general-purpose computing device. The components of the correlation engine 134 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The correlation engine 134 typically includes a variety of computer system readable media. Such media may be any available media that is accessible by the correlation engine 134, and it includes both volatile and non-volatile media, removable and non-removable media.

System memory 728 can include computer system readable media in the form of volatile memory, such as random access memory (RAM) 730 and/or cache memory 732. The correlation engine 134 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 715 may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The correlation engine 134 may also communicate with one or more external devices such as a keyboard, a pointing device, a display, etc.; one or more devices that enable a user to interact with the correlation engine 134; and/or any devices (e.g., network card, modem, etc.) that enable the correlation engine 134 to communicate with one or more other computing devices. Such communication can occur via Input/Output (I/O) interfaces 722. Still yet, the correlation engine 134 can communicate with one or more networks such as a local area network (LAN), a general wide area network (WAN), and/or a public network (e.g., the Internet) via network adapter 720. As depicted, network adapter 720 communicates with the other components of the correlation engine 134 via bus 718. It should be understood that although not shown, other hardware and/or software components could be used in conjunction with the correlation engine 134. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network monitoring system for monitoring calls in a VoLTE network, the calls having session initiation protocol (SIP), real time protocol (RTP) and H.248 portions, the network monitoring system comprising:
   one or more monitoring probes, executed by one or more processors, coupled to network interfaces and placed at different monitoring points and first correlation processor and second correlation processor, the one or more monitoring probes configured to capture data packets from the network interfaces, the data packets associated with messages exchanged between network nodes, the one or more monitoring probes further configured to:
   generate SIP data records, RTP data records and H.248 data records by monitoring the SIP, RTP and H.248 portions of the calls in the VoLTE network;
   for each generated SIP data record:
      send the generated SIP data record to the second correlation processor based on a distribution key;
      generate a routing label, wherein the routing label includes at least the distribution key, a first attribute and a second attribute; and
      send the generated routing label to the first correlation processor;
   for each generated H.248 data record and generated RTP data record:
      send the generated H.248 data record and the generated RTP data record to the first correlation processor based on the first and the second attributes, respectively;
   the first correlation processor configured to:
      correlate received RTP data records and the generated routing label for each generated SIP record based on the second attribute;
      correlate received H.248 data records and the generated routing label for each generated SIP data record based on the first attribute;
      insert the distribution key into the correlated RTP and H.248 data records; and
      send the correlated RTP data records and the correlated H.248 data records to the second correlation processor based on the distribution key; and
   the second correlation processor configured to:
      bind the generated SIP data records with the correlated RTP data records and with the correlated H.248 data records to a single call based on the distribution key.

2. The network monitoring system as recited in claim 1, wherein the distribution key comprises a phone number associated with a calling party.

3. The network monitoring system as recited in claim 2, wherein the one or more monitoring probes are further configured to correlate the generated SIP data records and the generated RTP data records based on the second attribute.

4. The network monitoring system as recited in claim 3, wherein the first attribute comprises an IP_Port attribute related to a call destination device.

5. The network monitoring system as recited in claim 4, wherein the second attribute comprises an IP_Port_Pair attribute.

6. The network monitoring system as recited in claim 1, wherein the generated H.248 data records and the generated RTP data records sent to the first correlation processor comprise undecorated data records.

7. The network monitoring system as recited in claim 1, wherein the one or more monitoring probes are further configured to recognize patterns being present in network packets, wherein the patterns are related to a subject of a monitoring task.

8. The network monitoring system as recited in claim 1, wherein the routing label for each generated SIP data record comprises an abbreviated data record.

9. A network monitoring system for monitoring calls in a VoLTE network, the calls having session initiation protocol (SIP), real time protocol (RTP) and H.248 portions and having one or more handover events affecting an established call, the network monitoring system comprising:
   one or more monitoring probes, executed by one or more processors, coupled to network interfaces and placed at different monitoring points, the one or more monitoring probes configured to capture data packets from the network interfaces, the data packets associated with messages exchanged between network nodes, the one or more monitoring probes further configured to:
   generate SIP data records, RTP data records and H.248 data records by monitoring the SIP, RTP and H.248 portions of the calls in the VoLTE network;
   for each generated SIP data record:
      determine whether the generated SIP data records include a distribution key;
      in response to determining that the generated SIP data records include the distribution key:
         send the generated SIP data record to a second correlation processor based on the distribution key;
         generate a routing label, wherein the routing label includes at least the distribution key, a first attribute, a second attribute and a third attribute; and
         send the generated routing label to a first correlation processor;
      in response to determining that the generated SIP data records do not include the distribution key:
         send the generated SIP data record to the first correlation processor based on the third attribute;
   for each generated H.248 data record and generated RTP data record, send the generated H.248 data record and the generated RTP data record to the first correlation processor based on the first attribute and the second attribute, respectively;
   the first correlation processor receiving the generated SIP data records, the generated RTP data records and the generated H.248 data records and routing labels from the one or more monitoring probes, the first correlation processor configured to:
      correlate the received generated SIP data records and the generated routing label for each generated SIP data record based on the third attribute;

correlate the received generated RTP data records and the generated routing label for each generated SIP data record based on the second attribute;

correlate the received generated H.248 data records and the generated routing label for each generated SIP data record based on the first attribute;

insert the distribution key into the correlated received generated SIP data records, the correlated received RTP data records and the correlated received H.248 data records; and send the correlated SIP data records, RTP data records and H.248 data records to the second correlation processor based on the distribution key; and the second correlation processor receiving the generated SIP data records, RTP data records and H.248 data records from the one or more monitoring probes and the correlated SIP data records, RTP data records and H.248 data records from the first correlation processor, the second correlation processor configured to:

bind the generated SIP data records with the correlated RTP data records and with the correlated H.248 data records to a single call based on the distribution key.

10. The network monitoring system as recited in claim 9, wherein the third attribute comprises a Call_ID attribute associated with an established call.

11. The network monitoring system as recited in claim 9, wherein the VoLTE network comprises one or more User Equipment (UE) devices and a plurality of Evolved NodeBs.

12. The network monitoring system as recited in claim 9, wherein the H.248 portion comprises at least H.248 signaling facilitating call set-up and call teardown functions.

13. The network monitoring system as recited in claim 9, wherein the first attribute comprises an IP_Port attribute related to a call destination device.

14. The network monitoring system as recited in claim 9, wherein the second attribute comprises an IP_Port_Pair attribute.

15. The network monitoring system as recited in claim 9, wherein the routing label for each generated SIP data record comprises an abbreviated data record.

* * * * *